(12) United States Patent
Kitakata et al.

(10) Patent No.: US 9,676,416 B2
(45) Date of Patent: Jun. 13, 2017

(54) VEHICLE BODY FRONT PORTION STRUCTURE AND LOAD RECEIVING MEMBER

(71) Applicants: TOYOTA JIDOSHA KABUSHIKI KAISHA, Toyota-shi, Aichi (JP); AISIN SEIKI KABUSHIKI KAISHA, Kariya-shi, Aichi (JP)

(72) Inventors: Shintaro Kitakata, Nissin (JP); Takanobu Kaneko, Kariya (JP)

(73) Assignees: TOYOTA JIDOSHA KABUSHIKI KAISHA, Toyota (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/766,423

(22) PCT Filed: Feb. 13, 2014

(86) PCT No.: PCT/JP2014/053362
§ 371 (c)(1),
(2) Date: Aug. 6, 2015

(87) PCT Pub. No.: WO2014/126165
PCT Pub. Date: Aug. 21, 2014

(65) Prior Publication Data
US 2015/0375789 A1    Dec. 31, 2015

(30) Foreign Application Priority Data
Feb. 15, 2013 (JP) .................. 2013-028232

(51) Int. Cl.
*B62D 21/15* (2006.01)
(52) U.S. Cl.
CPC ................... *B62D 21/152* (2013.01)

(58) Field of Classification Search
CPC ................................... B62D 21/152
(Continued)

(56) References Cited

U.S. PATENT DOCUMENTS 6,364,358 B1   4/2002 Miller
6,957,846 B2 * 10/2005 Saeki ............... B62D 21/152
                                                        180/232

(Continued)

FOREIGN PATENT DOCUMENTS

JP    S58-89475 A     5/1983
JP    2006-175987 A   7/2006
(Continued)

OTHER PUBLICATIONS

Feb. 3, 2016 Extended Search Report issued in European Patent Application No. 147517692.

*Primary Examiner* — Joseph D Pape
*Assistant Examiner* — Dana Ivey
(74) *Attorney, Agent, or Firm* — Oliff PLC

(57) ABSTRACT

A vehicle body front portion structure is equipped with a front side member that is disposed along a vehicle front and rear direction at a vehicle width direction outer side of a power unit disposed in a vehicle body front portion. A spacer is attached to an outside portion at the vehicle width direction outer side of the front side member. The spacer has a rear side attachment portion that is joined to the outside portion of the front side member, an outside front wall portion that is positioned at the vehicle front and rear direction front side and the vehicle width direction outer side of the rear side attachment portion, and a load transmitting rib that interconnects the outside front wall portion and the rear side attachment portion.

8 Claims, 6 Drawing Sheets

(58) Field of Classification Search
USPC .................................................... 296/187.1
See application file for complete search history.

(56)              References Cited

U.S. PATENT DOCUMENTS

| | | |
|---|---|---|
| 2012/0248820 A1 | 10/2012 | Yasui et al. |
| 2013/0241233 A1 | 9/2013 | Ohnaka et al. |
| 2014/0035325 A1 | 2/2014 | Naito et al. |
| 2015/0115653 A1 | 4/2015 | Ookubo et al. |

FOREIGN PATENT DOCUMENTS

| | | |
|---|---|---|
| JP | 2006-175988 A | 7/2006 |
| JP | 2011-245910 A | 12/2011 |
| JP | 2012-166743 A | 9/2012 |
| JP | 2012-214211 A | 11/2012 |
| JP | 2012-228907 A | 11/2012 |
| JP | 2013-193572 A | 9/2013 |
| JP | 2014-058184 A | 4/2014 |
| WO | 2012/114824 A1 | 8/2012 |
| WO | 2013/172132 A1 | 11/2013 |

\* cited by examiner

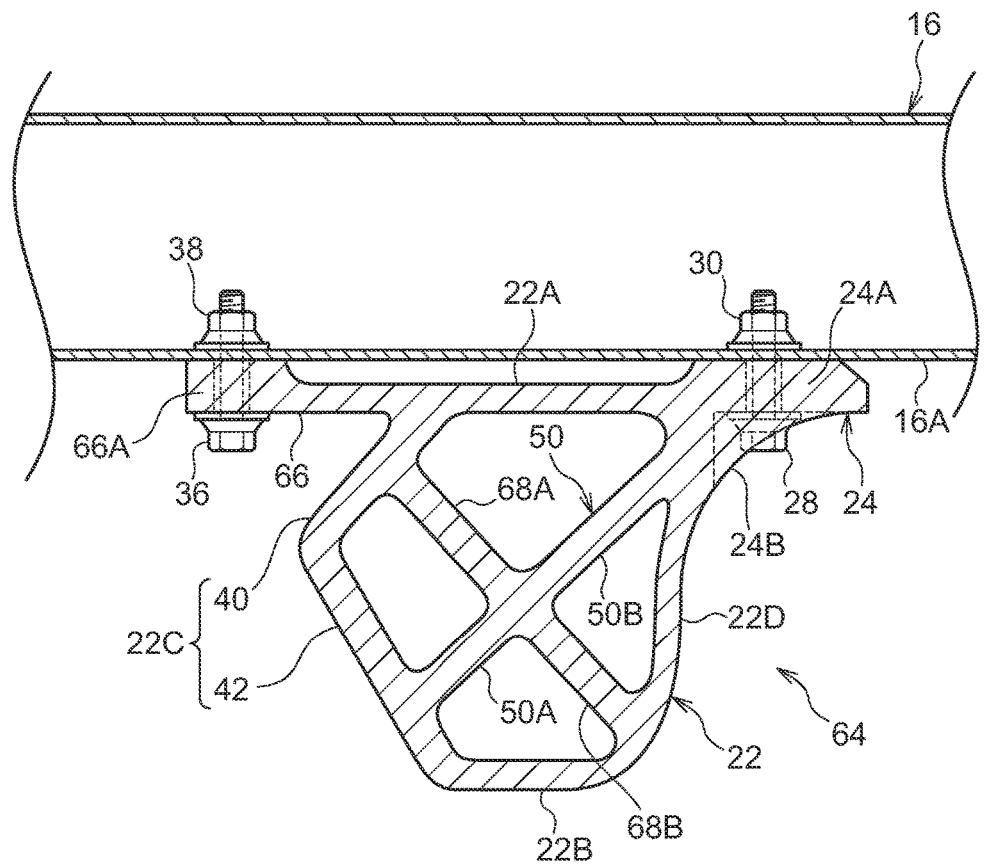

VEHICLE BODY FRONT PORTION STRUCTURE AND LOAD RECEIVING MEMBER

TECHNICAL FIELD

The present invention relates to a vehicle body front portion structure and a load receiving member.

BACKGROUND ART

A vehicle front portion structure is known which is equipped with a pair of front side members that are disposed at both sides of a power unit, branch frames that extend in the vehicle front direction and outward in the vehicle width direction from the front side members, and coupling members that couple front end portions of the branch frames and the front side members to one another (e.g., see JP-A No. 2012-214211).

In the vehicle front portion structure disclosed in JP-A No. 2012-214211, during a vehicle frontal crash on the vehicle width direction outer side of the front side member (hereinafter this crash mode will be called a "small overlap crash"), a load (lateral load) directed inward in the vehicle width direction is transmitted to the power unit via the branch frame. Because of this, the load is transmitted via the power unit to the front side member on the opposite side of the crash side, and crash performance with respect to a small overlap crash is improved. Furthermore, as a technology relating to a small overlap crash, JP-A No. 2012-166743, for example, is known.

SUMMARY OF INVENTION

Technical Problem

However, in the vehicle front portion structure disclosed in JP-A No. 2012-214211, there is room for improvement in order to more efficiently transmit to the power unit the lateral load directed inward in the vehicle width direction.

In view of these circumstances, it is an object of the present invention to obtain a vehicle body front portion structure and a load receiving member which, during a small overlap crash, can more efficiently transmit to the power unit the load directed inward in the vehicle width direction.

Solution to Problem

A vehicle body front portion structure pertaining to a first aspect of the present invention comprises: a front side member that is disposed along a vehicle front and rear direction at a vehicle width direction outer side of a power unit disposed in a vehicle body front portion; and a load receiving member that has a joint portion that is joined to an outside portion at the vehicle width direction outer side of the front side member, a load input portion that is positioned at the vehicle front and rear direction front side and the vehicle width direction outer side of the joint portion, and a load transmitting rib that interconnects the load input portion and the joint portion.

According to the vehicle body front portion structure pertaining to the first aspect, the load receiving member has the load input portion that is positioned at the vehicle front and rear direction front side and the vehicle width direction outer side of the joint portion that is joined to the outside portion at the vehicle width direction outer side of the front side member. The load input portion and the joint portion are interconnected by the load transmitting rib.

Consequently, when, during a small overlap crash, an impactor impacts on the load input portion of the load receiving member, a load directed rearward in the vehicle front and rear direction and inward in the vehicle width direction is transmitted from the load input portion via the load transmitting rib to the joint portion. Because of this, the load receiving member moves rearward in the vehicle front and rear direction and inward in the vehicle width direction while causing the front side member to deform inward in the vehicle width direction starting at the joint portion. As a result, the power unit is pushed rearward in the vehicle front and rear direction and inward in the vehicle width direction by the deformed front side member or the load receiving member, and a lateral load (component force) directed inward in the vehicle width direction is transmitted to the power unit.

A vehicle body front portion structure pertaining to a second aspect of the present invention is the vehicle body front portion structure pertaining to the first aspect, wherein the load input portion is inclined with respect to the vehicle width direction so as to be extend rearward in the vehicle front and rear direction as it extends outward in the vehicle width direction.

According to the vehicle body front portion structure pertaining to the second aspect, the load input portion is inclined with respect to the vehicle width direction so as to be extend rearward in the vehicle front as it extends outward in the vehicle width direction, so when an impactor has impacted on the load input portion, a component force along the extension direction of the load transmitting rib can be generated. Because of this, the efficiency with which the load is transmitted from the load input portion to the load transmitting rib is improved.

A vehicle body front portion structure pertaining to a third aspect of the present invention is the vehicle body front portion structure pertaining to the first aspect or the second aspect, wherein the load receiving member comprises: an inside wall portion that is disposed at the vehicle width direction inner side of the load transmitting rib and interconnects the load input portion and the joint portion; an outside wall portion that is disposed at the vehicle width direction outer side of the load transmitting rib and interconnects the load input portion and the joint portion; and a coupling rib that extends in a direction intersecting the load transmitting rib and that couples the load transmitting rib to at least one of the inside wall portion and the outside wall portion.

According to the vehicle body front portion structure pertaining to the third aspect, the load transmitting rib is coupled to at least one of the inside wall portion and the outside wall portion by the coupling rib that extends in a direction intersecting the load transmitting rib. Because of this, when an impactor has impacted on the load input portion, buckling (lateral buckling) of the load transmitting rib is controlled.

A vehicle body front portion structure pertaining to a fourth aspect of the present invention is the vehicle body front portion structure according to any one of the first aspect to the third aspect, wherein the load receiving member is formed from metal.

According to the vehicle body front portion structure pertaining to the fourth aspect, the load receiving member is formed from metal, so it becomes easy to ensure strength and the joint portion of the load receiving member can be easily joined (fastened) to the front side member using bolts, for example.

A load receiving member pertaining to a fifth aspect of the present invention comprises: a joint portion that is configured to be joined to an outside portion, at a vehicle width direction outer side, of a front side member that is disposed along a vehicle front and rear direction at the vehicle width direction outer side of a power unit disposed in a vehicle body front portion; a load input portion that is positioned at the vehicle front and rear direction front side and the vehicle width direction outer side of the joint portion; and a load transmitting rib that interconnects the load input portion and the joint portion.

According to the load receiving member pertaining to the fifth aspect, the load receiving member has the load input portion that is positioned at the vehicle front and rear direction front side and the vehicle width direction outer side of the joint portion that is joined to the outside portion at the vehicle width direction outer side of the front side member. The load input portion and the joint portion are interconnected by the load transmitting rib.

Consequently, when, during a small overlap crash, an impactor impacts on the load input portion of the load receiving member, a load directed rearward in the vehicle front and rear direction and inward in the vehicle width direction is transmitted from the load input portion via the load transmitting rib to the joint portion. Because of this, the load receiving member moves rearward in the vehicle front and rear direction and inward in the vehicle width direction while causing the front side member to deform inward in the vehicle width direction starting at the joint portion. As a result, the power unit is pushed rearward in the vehicle front and rear direction and inward in the vehicle width direction by the deformed front side member or the load receiving member, and a lateral load (component force) directed inward in the vehicle width direction is transmitted to the power unit.

Advantageous Effects of Invention

According to the vehicle body front portion structure pertaining to the first aspect, during a small overlap crash, the load directed inward in the vehicle width direction can be more efficiently transmitted to the power unit.

According to the vehicle body front portion structure pertaining to the second aspect, the front side member can be more efficiently caused to deform inward in the vehicle width direction.

According to the vehicle body front portion structure pertaining to the third aspect, when an impactor has impacted on the load input portion, the load can be more reliably transmitted to the joint portion of the load receiving member.

According to the vehicle body front portion structure pertaining to the fourth aspect, the manufacturing cost of the load receiving member and the cost of attaching the load receiving member to the outside portion of the front side member can be reduced.

According to the load receiving member pertaining to the fifth aspect, during a small overlap crash, the load directed inward in the vehicle width direction can be more efficiently transmitted to the power unit.

BRIEF DESCRIPTION OF DRAWINGS

FIG. 6 is a plan cross-sectional view, corresponding to FIG. 2, showing an example modification of the load transmitting rib in the embodiment of the present invention.

DESCRIPTION OF EMBODIMENT

Figure 1:
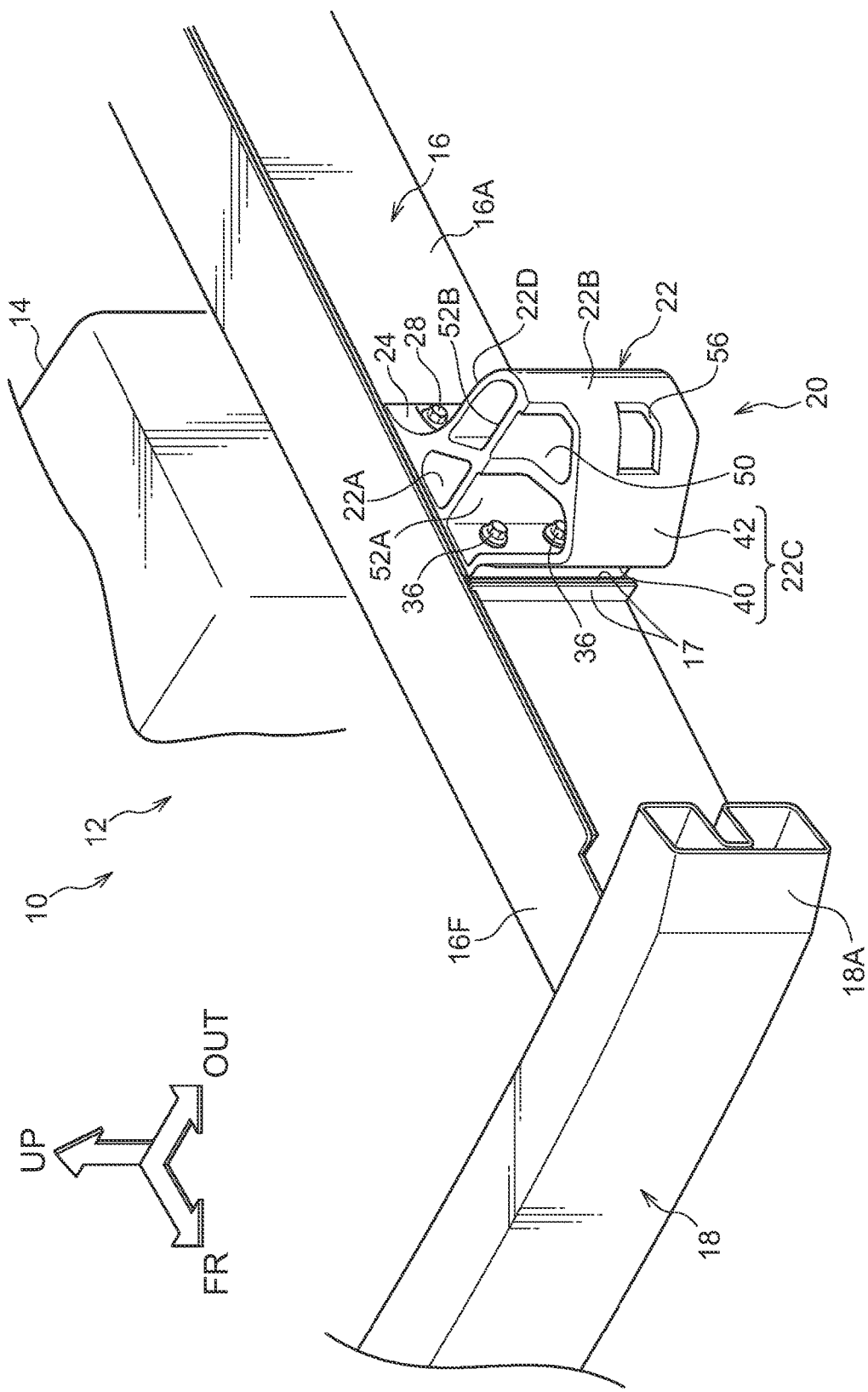
FIG. 1 is a perspective view showing the left side of a vehicle body front portion to which a vehicle body front portion structure pertaining to an embodiment of the present invention has been applied.

A vehicle body front portion structure pertaining to an embodiment of the present invention will be described below with reference to the drawings. Note that arrow UP illustrated in the drawings indicates an upward direction in a vehicle up and down direction, arrow FR indicates a frontward direction in a vehicle front and rear direction, and arrow OUT indicates an outward direction (the vehicle body left side) in a vehicle width direction.

In FIG. 1, there is illustrated a vehicle body front portion 12 to which a vehicle body front portion structure 10 pertaining to the present embodiment has been applied. As illustrated in FIG. 1, the vehicle body front portion 12 is equipped with a power unit 14, a pair of front side members 16 that are disposed at both vehicle width direction sides of the power unit 14, and a front bumper reinforcement 18 that is disposed at the vehicle front and rear direction front side of the power unit 14. Note that the vehicle body front portion 12 is, regarding configurations other than that of a later-described spacer 20, configured to be bilaterally symmetrical with respect to the vehicle width direction central portion of the vehicle body front portion 12. For that reason, below, the configurations on the left side of the vehicle body front portion 12 will be described and description regarding the configurations on the right side of the vehicle body front portion 12 will be omitted.

The power unit 14 is a drive source that drives at least front wheels (not illustrated in the drawings) of the vehicle to rotate, and the power unit 14 is configured to include at least one of an engine serving as an internal combustion engine and an electric motor. The power unit 14 is supported on the pair of front side members 16 via non-illustrated mounting brackets. Note that a non-illustrated cabin is disposed at the vehicle front and rear direction rear side of the power unit 14.

The pair of front side members 16 are frame members that configure the frame of both side portions of the vehicle body front portion 12, and the pair of front side members 16 extend in the vehicle front and rear direction and have closed cross sections whose cross-sectional shape is substantially rectangular. Front end portions 16F of the pair of front side members 16 are coupled to one another in the vehicle width direction by the front bumper reinforcement 18.

The front bumper reinforcement 18 extends in the vehicle width direction and has a closed cross section whose cross-sectional shape is substantially rectangular. Vehicle width direction outer end portions 18A of the front bumper reinforcement 18 extend outward in the vehicle width direction from the front side members 16. Note that the front end portions 16F of the front side members 16 may also be joined to the front bumper reinforcement 18 via tubular crash boxes (not illustrated in the drawings) that undergo axial compression deformation during a frontal crash and absorb the crash energy.

Here, a spacer 20 serving as an example of a load receiving member is attached to an outside portion 16A on the vehicle width direction outer side of the left-side front side member 16. The spacer 20 has a spacer main body portion 22 and a flange portion 24 and is formed by an extruded part formed from aluminum.

Note that, in the present embodiment, the spacer 20 is attached only to the left-side front side member 16 as a small overlap crash countermeasure with respect to the left side of the vehicle body front portion 12, and the spacer 20 is not attached to the right-side front side member 16. Furthermore, the front side of the upper portion of the spacer main body portion 22 is cut out so as to not interfere with a non-illustrated air duct.

Figure 2:
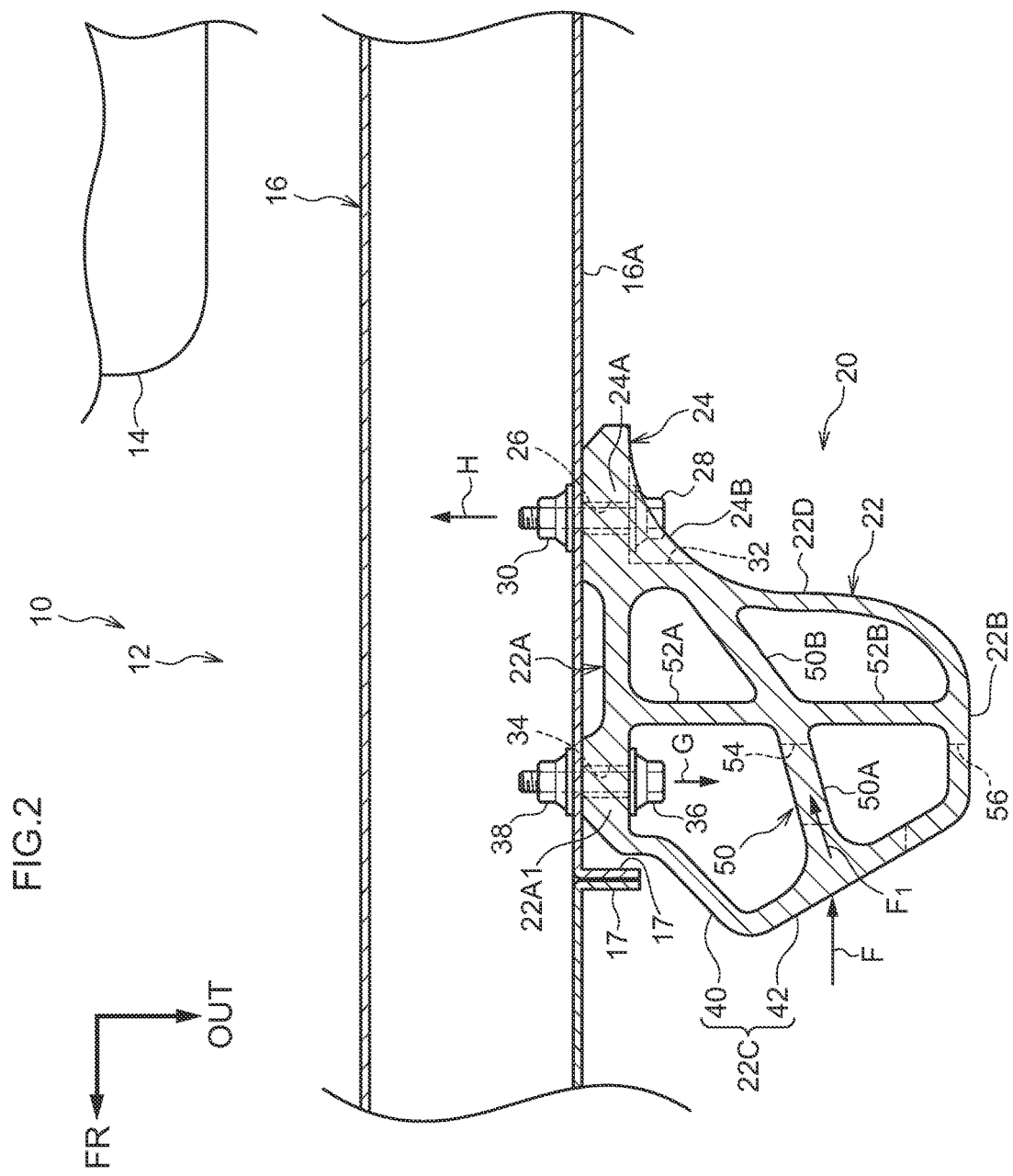
FIG. 2 is a plan cross-sectional view showing a load transmitting rib of a spacer illustrated in FIG. 1.

As illustrated in FIG. 2, the spacer main body portion 22 has a closed cross section whose cross-sectional shape (plan cross-sectional shape) as seen from the vehicle up and down direction is substantially rectangular (substantially pentagonal). The spacer main body portion 22 has an inner wall portion 22A and an outer wall portion 22B, which oppose one another in the vehicle width direction, and a front wall portion 22C and a rear wall portion 22D, which oppose one another in the vehicle front and rear direction.

The inner wall portion 22A extends in the vehicle front and rear direction along the outside portion 16A of the front side member 16. The flange portion 24 that extends rearward in the vehicle front and rear direction is disposed at the vehicle front and rear direction rear end portion of the inner wall portion 22A. In other words, the inner wall portion 22A extends from the flange portion 24 frontward in the vehicle front and rear direction along the outside portion 16A of the front side member 16.

A rear side attachment portion 24A, serving as an example of a joint portion configured to be joined to the outside portion 16A of the front side member 16, is disposed at the flange portion 24. Attachment holes 26 through which bolts 28 are passed are formed in the rear side attachment portion 24A. By passing the bolts 28 through the outside portion 16A of the front side member 16 and fastening them with weld nuts 30, the rear side attachment portion 24A is joined to the outside portion 16A of the front side member 16.

Note that the vehicle width direction outer surface of the flange portion 24 is a curved surface 24B that gently curves outward in the vehicle width direction heading from the vehicle front and rear direction rear end side toward the rear wall portion 22D. Counterbore portions 32, to which the head portions of the bolts 28 are anchored, are respectively formed in the curved surface 24B.

A front side attachment portion 22A1 that is joined to the outside portion 16A of the front side member 16 is disposed at the vehicle front and rear direction front side of the inner wall portion 22A. Attachment holes 34 through which bolts 36 are passed are formed in the front side attachment portion 22A1. By passing the bolts 36 through the outside portion 16A of the front side member 16 and fastening them with weld nuts 38, the front side attachment portion 22A1 is joined to the outside portion 16A of the front side member 16.

The front wall portion 22C of the spacer main body portion 22 is bent in such a way as to project frontward in the vehicle front and rear direction. The front wall portion 22C has an inside front wall portion 40 positioned on the inside in the vehicle width direction and an outside front wall portion 42 positioned on the outside in the vehicle width direction. The inside front wall portion 40 is inclined with respect to the vehicle width direction so as to be extend frontward in the vehicle front and rear direction as it extends from the vehicle front and rear direction front end portion of the inner wall portion 22A outward in the vehicle width direction. Note that a vehicle width direction intermediate portion of the inside front wall portion 40 is bent in such a way as to avoid a pair of flange portions 17 that project outward in the vehicle width direction from the outside portion 16A of the front side member 16.

The outside front wall portion 42, which serves as an example of a load input portion, is positioned on the vehicle front and rear direction front side and the vehicle width direction outer side of the rear side attachment portion 24A. The outside front wall portion 42 is configured in such a way that, during a small overlap crash, a load directed rearward in the vehicle front and rear direction (hereinafter this load will be called a "crash load") F is input to it.

Furthermore, the outside front wall portion 42 is inclined with respect to the vehicle width direction so as to be extend rearward in the vehicle front and rear direction as it extends outward in the vehicle width direction. More specifically, the outside front wall portion 42 is inclined with respect to the vehicle width direction in such a way that, when the crash load F has been input to it, a push-in load H that pushes the bolts 28 of the rear side attachment portion 24A inward in the vehicle width direction becomes greater than a pull-out load G that pulls the bolts 36 of the front side attachment portion 22A1 outward in the vehicle width direction (H>G). Moreover, because the outside front wall portion 42 is inclined with respect to the vehicle width direction as described above, when the crash load F has been input to the outside front wall portion 42, it becomes easier for a component force F1 along the extension direction of a later-described load transmitting rib 50 to be generated.

Furthermore, a load transmitting rib 50 extends from a vehicle width direction intermediate portion (in the present embodiment, the central portion) of the outside front wall portion 42 toward the rear side attachment portion 24A. The outside front wall portion 42 and the rear side attachment portion 24A are interconnected by the load transmitting rib 50. The load transmitting rib 50 is formed in the shape of a wall. Furthermore, the load transmitting rib 50 is inclined with respect to the vehicle front and rear direction overall so as to be extend inward in the vehicle width direction as it extends rearward in the vehicle front and rear direction. Part of the crash load F that has been input to the outside front wall portion 42 is transmitted to the rear side attachment portion 24A by the load transmitting rib 50. Furthermore, the thickness of the load transmitting rib 50 is set to a value according to the envisioned crash load F. Note that, in the present embodiment, the thickness of the load transmitting rib 50 is the largest in the spacer main body portion 22.

Moreover, the load transmitting rib 50 is coupled to the inner wall portion 22A and the outer wall portion 22B by a pair of coupling ribs 52A and 52B. Specifically, the inside front wall portion 40 and the inner wall portion 22A are disposed at the vehicle width direction inner side of the load transmitting rib 50. The inside front wall portion 40 and the inner wall portion 22A form an inside wall portion that extends from the vehicle width direction inner end portion of the outside front wall portion 42 toward the rear side attachment portion 24A and interconnects the outside front wall portion 42 and the rear side attachment portion 24A. Furthermore, the outer wall portion 22B and the rear wall portion 22D are disposed at the vehicle width direction outer side of the load transmitting rib 50. The outer wall portion 22B and the rear wall portion 22D form an outside wall portion that extends from the vehicle width direction outer end portion of the outside front wall portion 42 toward the rear side attachment portion 24A and interconnects the outside front wall portion 42 and the rear side attachment portion 24A.

The pair of coupling ribs 52A and 52B are each formed in the shape of a wall. Furthermore, the pair of coupling ribs 52A and 52B extend in a direction intersecting the load transmitting rib 50 (in the present embodiment, the vehicle width direction) and are connected to a vehicle front and rear direction intermediate portion of the load transmitting rib 50 in such a way as to be continuous with one another. The load transmitting rib 50 is reinforced in the vehicle width direction by the pair of coupling ribs 52A and 52B.

Note that work holes 54 and 56 for inserting the bolts 36 into the attachment holes 34 in the front side attachment portion 22A1 are formed in a vehicle front and rear direction front side portion 50A of the load transmitting rib 50 and in the vehicle front and rear direction front side portion of the outer wall portion 22B. Furthermore, the front side portion 50A of the load transmitting rib 50 is inclined inward in the vehicle width direction with respect to a vehicle front and rear direction rear side portion 50B of the load transmitting rib 50 so as to make it easier to form the work hole 54. Note that the work hole 56 is formed straddling the outer wall portion 22B and the outside front wall portion 42.

Figure 3:
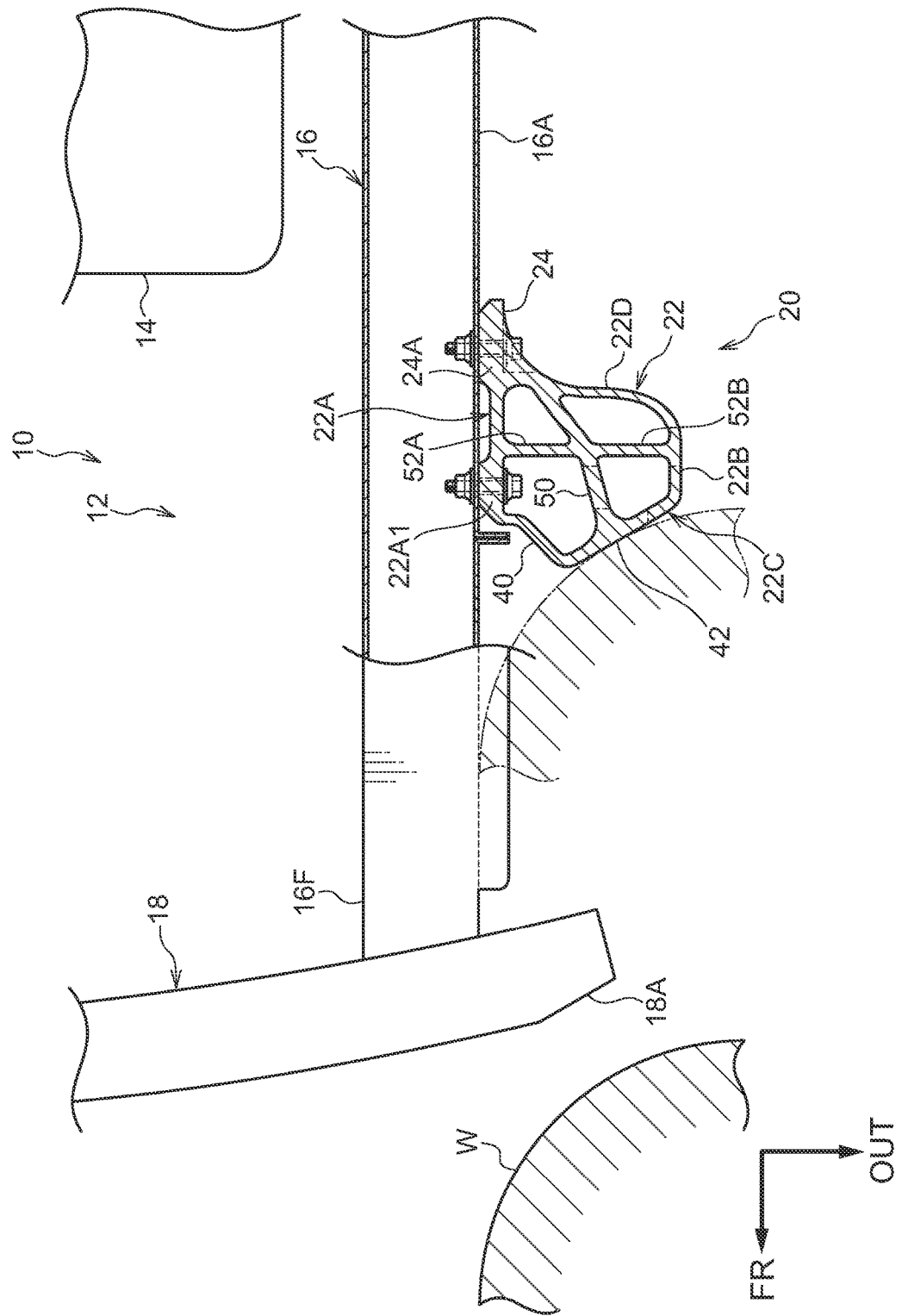
FIG. 3 is a plan view showing the left side of the vehicle body front portion illustrated in FIG. 1.

The spacer 20 configured in this way is, as illustrated FIG. 3, disposed at the vehicle width direction outer side of the front side member 16 in such a way that the power unit 14 is positioned on an extension of the load transmitting rib 50. Furthermore, the spacer 20 is joined to the outside portion 16A of the front side member 16 at the front side attachment portion 22A1 and the rear side attachment portion 24A that are adjacent to one another in the vehicle front and rear direction as seen in a plan view. Note that, in the present embodiment, the rear side attachment portion 24A of the spacer 20 is positioned on the vehicle front and rear direction front side of the power unit 14.

Next, the action of the present embodiment will be described.

As illustrated in FIG. 3, the spacer 20 is joined to the outside portion 16A of the front side member 16 at the front side attachment portion 22A1 and the rear side attachment portion 24A that are adjacent to one another in the vehicle front and rear direction as seen in a plan view. The spacer 20 has the outside front wall portion 42 that is positioned on the vehicle front and rear direction front side and the vehicle width direction outer side of the rear side attachment portion 24A. The outside front wall portion 42 and the rear side attachment portion 24A are interconnected by the load transmitting rib 50.

Figure 4:
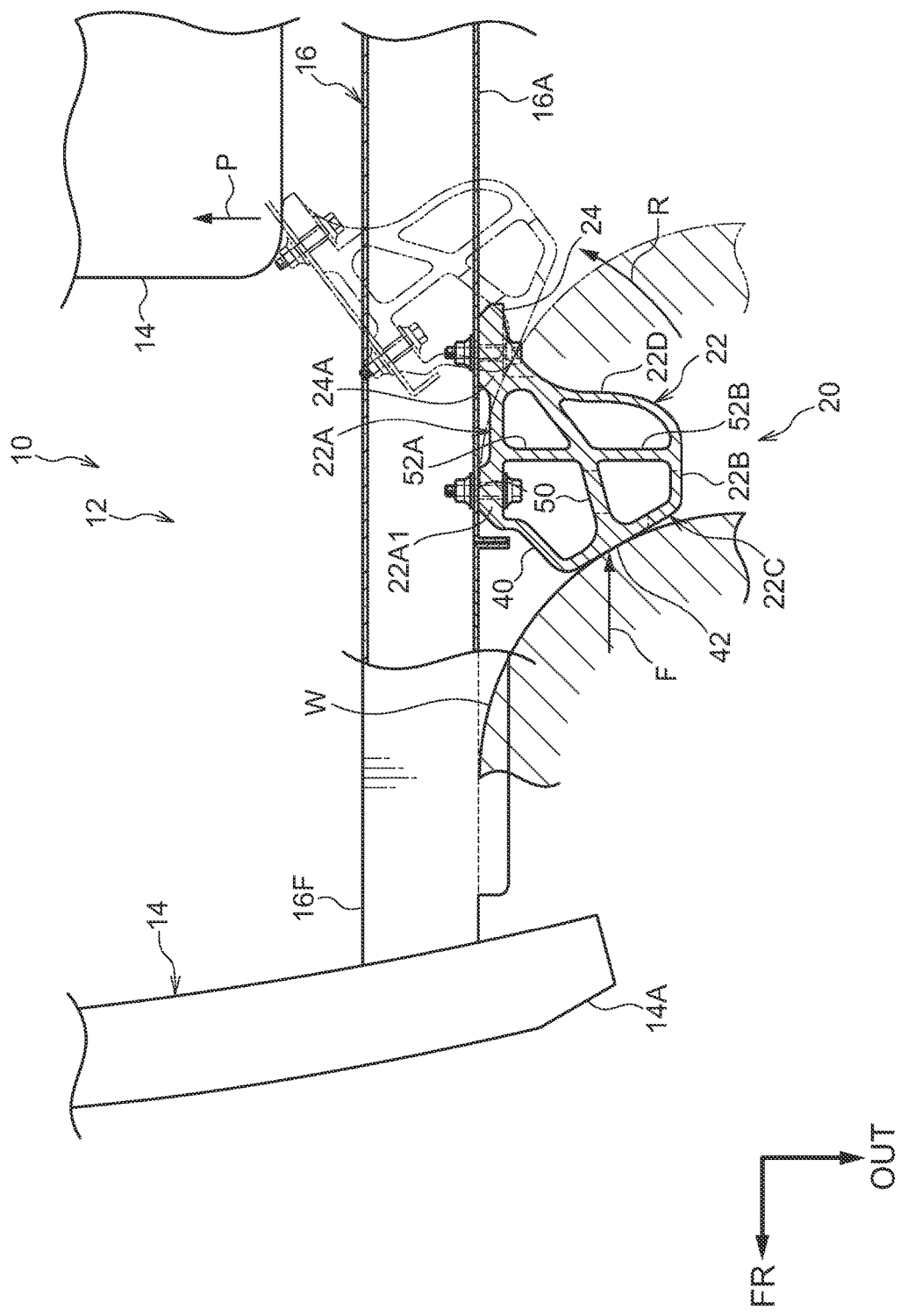
FIG. 4 is a plan view showing a state in which an impactor has impacted on the spacer illustrated in FIG. 3.

Consequently, during a small overlap crash in which an impactor W impacts on the outer end portion 18A of the front bumper reinforcement 18 positioned on the vehicle width direction outer side of the front side member 16, the following happens. Namely, as illustrated in FIG. 4, the impactor W impacts on the outside front wall portion 42 of the spacer 20 in accompaniment with the forward travel of the vehicle and the crash load F is input to the outside front wall portion 42. Part of the crash load F is transmitted rearward in the vehicle front and rear direction and inward in the vehicle width direction from the outside front wall portion 42 via the load transmitting rib 50 to the rear side attachment portion 24A. In other words, the outside portion 16A of the front side member 16 is pushed rearward in the vehicle front and rear direction and inward in the vehicle width direction by the rear side attachment portion 24A of the spacer 20. Because of this, the front side member 16 becomes bent and deformed inward in the vehicle width direction starting at the rear side attachment portion 24A.

Furthermore, in accompaniment with the bending deformation of the front side member 16, the spacer 20 rotationally moves about the rear side attachment portion 24A toward the power unit 14 as indicated by arrow R. As a result, the power unit 14 is pushed rearward in the vehicle front and rear direction and inward in the vehicle width direction by the deformed front side member 16 or the rotationally moved spacer 20, and a lateral load (component force) P directed inward in the vehicle width direction is transmitted to the power unit 14. Because of this, the vehicle body front portion 12 slides in a direction away from the impactor W in the vehicle width direction, and part of the crash load F is transmitted via the power unit 14 to the front side member (not illustrated in the drawings) on the opposite side (right side) of the crash side. Consequently, deformation of the non-illustrated cabin formed on the vehicle front and rear direction rear side of the power unit 14 is reduced, so crash performance with respect to a small overlap crash is improved.

In this way, according to the vehicle body front portion structure 10 pertaining to the present embodiment, by using the load transmitting rib 50 to cause part of the crash load F to concentrate in the rear side attachment portion 24A of the spacer 20 and cause the front side member 16 to bend and deform inward in the vehicle width direction, the lateral load P directed inward in the vehicle width direction can be more efficiently transmitted to the power unit 14.

Furthermore, as illustrated in FIG. 2, the outside front wall portion 42 of the spacer 20 in inclined with respect to the vehicle width direction so as to be extend rearward in the vehicle front and rear direction as it extends outward in the vehicle width direction. Consequently, when the crash load F has been input to the outside front wall portion 42, it becomes easier for the component force F1 along the extension direction of the load transmitting rib 50 to be generated. Because of this, the efficiency with which the load is transmitted from the outside front wall portion 42 to the load transmitting rib 50 is improved. Consequently, the front side member 16 can be more efficiently caused to bend and deform inward in the vehicle width direction starting at the rear side attachment portion 24A.

Moreover, the load transmitting rib 50 is coupled to the inner wall portion 22A and the outer wall portion 22B by the pair of coupling ribs 52A and 52B. Because of this, when the impactor W has impacted on the outside front wall portion 42, the vehicle width direction displacement of the load transmitting rib 50 is regulated by the pair of coupling ribs 52A and 52B, so buckling (lateral buckling) of the load transmitting rib 50 is controlled. Consequently, when the impactor W has impacted on the outside front wall portion 42, part of the crash load F can be more reliably transmitted to the rear side attachment portion 24A of the spacer 20.

Moreover, because the spacer 20 is formed from aluminum, the spacer 20 can be made lightweight while ensuring the strength of the spacer 20. Furthermore, for example, in a case where the spacer 20 is formed from resin, collars formed from metal for the bolts 28 and 36 become necessary in order to ensure joint strength with the outside portion 16A of the front side member 16, but when the spacer 20 is formed from metal such as aluminum, the collars formed from metal become unnecessary. Consequently, the structure of the spacer 20 is simplified, so the manufacturing cost of the spacer 20 can be reduced.

Moreover, because the spacer 20 is formed by an extruded part, the processing of the spacer 20 becomes easy, so the manufacturing cost of the spacer can be reduced.

Next, example modifications of the above embodiment will be described.

Figure 5:
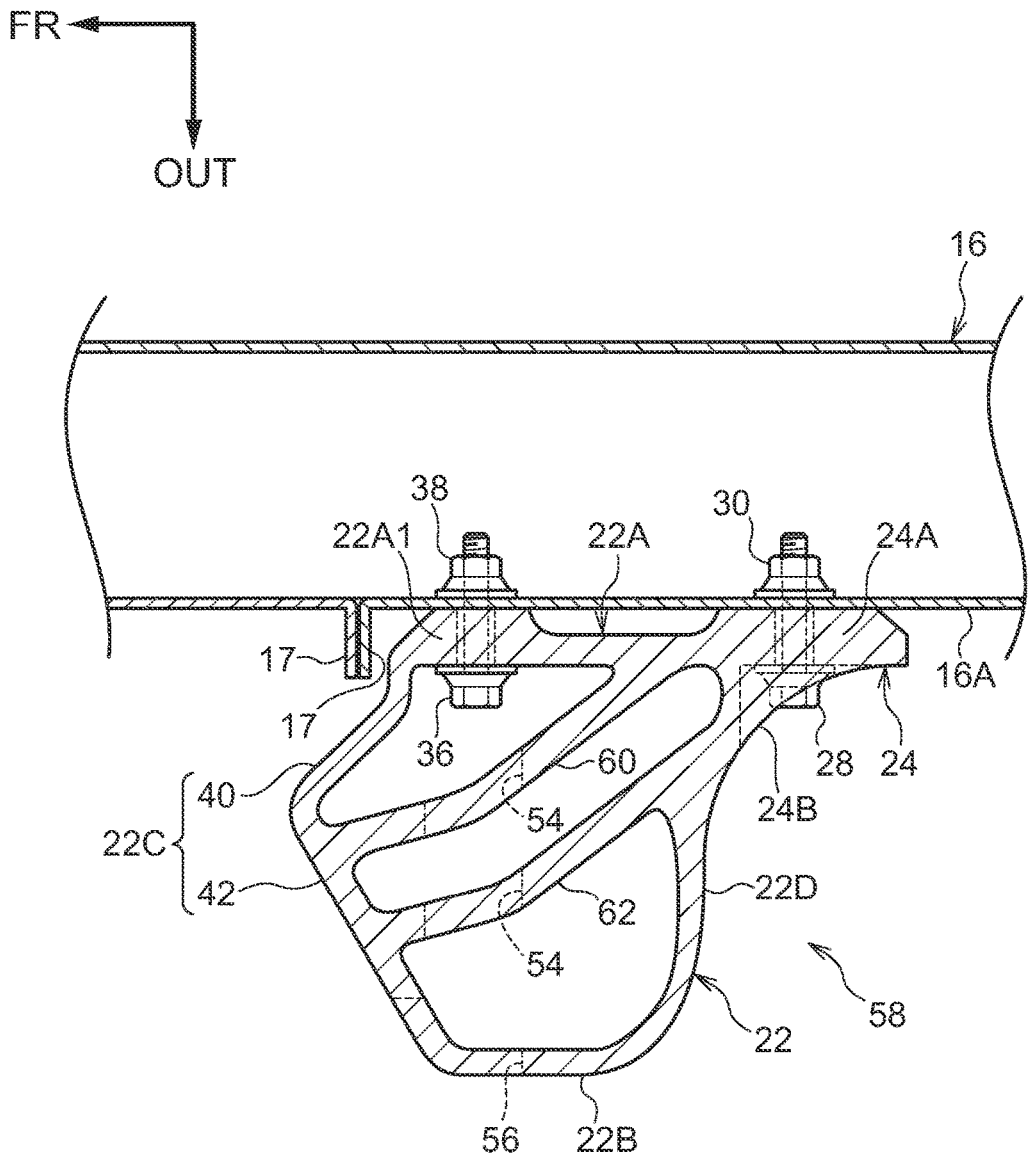
FIG. 5 is a plan cross-sectional view, corresponding to FIG. 2, showing an example modification of the load transmitting rib in the embodiment of the present invention.

In the above embodiment, an example was described where the one load transmitting rib 50 is disposed in the spacer main body portion 22 of the spacer 20, but the present invention is not limited to this. For example, two load transmitting ribs 60 and 62 may also be disposed in the spacer main body portion 22 like in a spacer 58 illustrated in FIG. 5. Furthermore, it is also possible to dispose three or more load transmitting ribs in the spacer main body portion 22. Moreover, although it is not illustrated in the drawing, it is also possible for the two load transmitting ribs 60 and 62 to be coupled to the inner wall portion 22A and outer wall portion 22B by coupling ribs.

Furthermore, in the above embodiment, as example was described where the front side attachment portion 22A1 is disposed in the inner wall portion 22A of the spacer 20, but the present invention is not limited to this. For example, in a spacer 64 illustrated in FIG. 6, a flange portion 66 that extends from the front end portion of the inner wall portion 22A frontward in the vehicle front and rear direction along the outside portion 16A of the front side member 16 may be disposed at the front end portion of the inner wall portion 22A. A front side attachment portion 66A positioned on the vehicle front and rear direction front side of the front wall portion 22C of the spacer main body portion 22 may be disposed in the flange portion 66, and the front side attachment portion 66A may be joined to the outside portion 16A of the front side member 16 by the bolts 36 and the weld nuts 38.

Furthermore, in the spacer 64 illustrated in FIG. 6, it is not necessary to form the work hole 54 (see FIG. 2) for the bolts 36 in the front side portion 50A of the load transmitting rib 50. Consequently, the load transmitting rib 50 can be allowed to extend linearly from the outside front wall portion 42 toward the rear side attachment portion 24A. Because of this, part of the crash load can be more efficiently transmitted to the rear side attachment portion 24A of the spacer 20. Note that, from the standpoint of the efficiency with which the crash load is transmitted from the outside front wall portion 42 to the load transmitting rib 50, it is preferred that the load transmitting rib 50 be connected perpendicularly or substantially perpendicularly with respect to the outside front wall portion 42.

Furthermore, in the above embodiment, an example was described where the load transmitting rib 50 is coupled to the inner wall portion 22A and the outer wall portion 22B by the pair of coupling ribs 52A and 52B, but the present invention is not limited to this. For example, the load transmitting rib 50 may also, like in the spacer 64 illustrated in FIG. 6, be coupled to the inside front wall portion 40 serving as the inside wall portion and the rear wall portion 22D serving as the outside wall portion by a pair of coupling ribs 68A and 68B.

Moreover, in the above embodiment, an example was described where the pair of coupling ribs 52A and 52B are continuous with one another, but the present invention is not limited to this. The pair of coupling ribs 52A and 52B may also be out of alignment with one another in the vehicle front and rear direction. Furthermore, at least one of the pair of coupling ribs 52A and 52B may also be omitted. In other words, the load transmitting rib 50 may also be coupled to at least one of the inner wall portion 22A and the outer wall portion 22B by one or plural coupling ribs.

Furthermore, in the above embodiment, an example was described where the outside front wall portion 42 of the spacer main body portion 22 is inclined with respect to the vehicle width direction so as to be extend rearward in the vehicle front and rear direction as it extends outward in the vehicle width direction, but the outside front wall portion 42 does not invariably have to be inclined with respect to the vehicle width direction. Furthermore, the angle of inclination of the outside front wall portion 42 with respect to the vehicle width direction can be appropriately changed.

Furthermore, in the above embodiment, an example was described where the spacer 20 is attached to the outside portion 16A of the front side member 16 in such a way that the rear side attachment portion 24A is positioned on the vehicle front and rear direction front side of the power unit 14, but the present invention is not limited to this. It suffices for the power unit 14 to lie on an extension of the load transmitting rib 50, so, for example, the spacer 20 and the power unit 14 may also be disposed adjacent to one another in the vehicle width direction.

Furthermore, in the above embodiment, an example was described where the spacer 20 is formed by an extruded part, but the present invention is not limited to this. The spacer 20 may also be formed by a pultruded part or a cast part, for example. Moreover, the spacer 20 is not limited to aluminum and may also be formed from another metal.

Moreover, in the above embodiment, an example was described where the spacer 20 is attached to only the left-side front side member 16, but the present invention is not limited to this. The spacer 20 can be attached to at least one of the pair of front side members 16 disposed at both vehicle width direction sides of the power unit 14.

The disclosure of Japanese Patent Application No. 2013-028232 filed on Feb. 15, 2013, is incorporated in its entirety by reference herein.

Furthermore, all documents, patent applications, and technical standards mentioned in this specification are incorporated by reference herein to the same extent as if each individual document, patent application, or technical standard were specifically and individually indicated to be incorporated by reference.

An embodiment of the present invention has been described above, but the present invention is not limited to this embodiment; the embodiment and its example modifications may also be appropriately combined and used, and naturally the present invention can be implemented in a various of ways without departing from the spirit of the present invention.

The invention claimed is:

1. A vehicle body front portion structure, comprising:
   a front side member that extends along a vehicle front and rear direction and is disposed at a vehicle width direction outer side of a power unit disposed in a vehicle body front portion; and
   a load receiving member that has (i) a front side attachment portion that is joined to an outside portion of the front side member at the vehicle width direction outer side of the front side member, (ii) a rear side attachment portion that is joined to the outside portion of the front side member at the vehicle front and rear direction rear side of the front side attachment portion, (iii) a load input portion that is positioned at the vehicle front and rear direction front side and the vehicle width direction outer side of the rear side attachment portion, (iv) a load transmitting rib that interconnects the load input portion and the rear side attachment portion, and (v) an outside wall portion that is disposed at the vehicle width direction outer side of the load transmitting rib, is spaced from the load transmitting rib, and interconnects the load input portion and the rear side attachment portion.

2. The vehicle body front portion structure according to claim 1, wherein the load input portion is inclined with respect to the vehicle width direction so as to extend rearwardly in the vehicle front and rear direction as the load input portion extends outward in the vehicle width direction.

3. The vehicle body front portion structure according to claim 1, wherein the load receiving member is formed from metal.

4. A load receiving member, comprising:
- a front side attachment portion that is configured to be joined to an outside portion of a front side member at a vehicle width direction outer side of the front side member, the front side member extending along a vehicle front and rear direction and disposed at the vehicle width direction outer side of a power unit disposed in a vehicle body front portion;
- a rear side attachment portion that is configured to be joined to the outside portion of the front side member at the vehicle front and rear direction rear side of the front side attachment portion;
- a load input portion that is positioned at the vehicle front and rear direction front side and the vehicle width direction outer side of the rear side attachment portion;
- a load transmitting rib that interconnects the load input portion and the rear side attachment portion; and
- an outside wall portion that is disposed at the vehicle width direction outer side of the load transmitting rib, is spaced from the load transmitting rib, and interconnects the load input portion and the rear side attachment portion.

5. The load receiving member according to claim 4, wherein the load input portion is inclined with respect to the vehicle width direction so as to extend rearwardly in the vehicle front and rear direction as the load input portion extends outward in the vehicle width direction.

6. The load receiving member according to claim 4, further comprising:
- an inside wall portion that is disposed at the vehicle width direction inner side of the load transmitting rib and interconnects the load input portion and the rear side attachment portion; and
- a coupling rib that extends in a direction intersecting the load transmitting rib and that couples the load transmitting rib to at least one of the inside wall portion and the outside wall portion.

7. The load receiving member according to claim 4, wherein the load receiving member is formed from metal.

8. A vehicle body front portion structure, comprising:
- a front side member that extends along a vehicle front and rear direction and is disposed at a vehicle width direction outer side of a power unit disposed in a vehicle body front portion; and
- a load receiving member that has (i) a front side attachment portion that is joined to an outside portion of the front side member at the vehicle width direction outer side of the front side member, (ii) a rear side attachment portion that is joined to the outside portion of the front side member at the vehicle front and rear direction rear side of the front side attachment portion, (iii) a load input portion that is positioned at the vehicle front and rear direction front side and the vehicle width direction outer side of the rear side attachment portion, (iv) a load transmitting rib that interconnects the load input portion and the rear side attachment portion, (v) an inside wall portion that is disposed at the vehicle width direction inner side of the load transmitting rib and interconnects the load input portion and the rear side attachment portion, (vi) an outside wall portion that is disposed at the vehicle width direction outer side of the load transmitting rib and interconnects the load input portion and the rear side attachment portion, and (vii) a coupling rib that extends in a direction intersecting the load transmitting rib and that couples the load transmitting rib to at least one of the inside wall portion and the outside wall portion.

\* \* \* \* \*